United States Patent
Mese et al.

(10) Patent No.: US 11,157,216 B2
(45) Date of Patent: Oct. 26, 2021

(54) METHODS AND DEVICES FOR MANAGING PRINTING OF CONTENT

(71) Applicant: Lenovo (Singapore) Pte. Ltd., New Tech Park (SG)

(72) Inventors: John Carl Mese, Cary, NC (US); Nathan J. Peterson, Oxford, NC (US); Russell Speight VanBlon, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 16/589,423

(22) Filed: Oct. 1, 2019

(65) Prior Publication Data

US 2021/0096788 A1 Apr. 1, 2021

(51) Int. Cl.
*G06F 3/12* (2006.01)

(52) U.S. Cl.
CPC ............ *G06F 3/1208* (2013.01); *G06F 3/125* (2013.01); *G06F 3/1243* (2013.01); *G06F 3/1255* (2013.01)

(58) Field of Classification Search
CPC ...... G06F 3/1208; G06F 3/125; G06F 3/1243; G06F 3/1255; H04N 1/2369; H04N 2201/3333; H04N 2201/05; H04N 1/32144; H04N 2201/0094
See application file for complete search history.

(56) References Cited

U.S. PATENT DOCUMENTS

| 5,642,205 A | * | 6/1997 | Kassmann | H04N 1/2307 355/24 |
| 2006/0204270 A1 | * | 9/2006 | Abe | G03G 15/50 399/82 |
| 2013/0250361 A1 | * | 9/2013 | Minegishi | G06F 3/1285 358/1.18 |
| 2014/0204418 A1 | * | 7/2014 | Yumita | G06F 3/1284 358/1.15 |

* cited by examiner

*Primary Examiner* — Kent Yip
(74) *Attorney, Agent, or Firm* — The Small Patent Law Group LLC; Josef L. Hoffmann

(57) ABSTRACT

A computer implemented method, device, and computer program product for managing printing of content on a printing device is provided. The method operates under control of one or more processors configured with specific executable program instructions. The method includes analyzing a request to print content to determine one or more characteristic of interest (COI) associated with the request. The method identifies types of printing attributes associated with the request. The types of printing attributes include printing settings and a duplex setting to be implemented at the printing device in connection with generating printed output. The method determines a user duplex expectation (UDE) status with respect to the one or more COI. The method manages addition of a duplex indicia (DI) to the printed output based on the determining and processes the request.

20 Claims, 6 Drawing Sheets

ASSIGNMENT AND DECLARATION FOR PATENT APPLICATIONS

Title of Invention: METHOD AND DEVICE FOR MANAGING PRINTING OF CONTENT

Under Attorney Docket Number: ABCD-US-NP (ABC-099US1)

As a below named inventor, I hereby declare that:

This declaration is directed to the attached application, or (if following box is checked):

[x] United States application or PCT international application number 12/345,678 filed on 01/01/2019.

The above-identified application was made or authorized to be made by me. I believe that I am the original inventor or an original joint inventor of a claimed invention in the application. I have reviewed and understand the contents of the application, including the claims. I am aware of the duty to disclose to the United States Patent and Trademark Office all information known to me to be material to patentability as defined in 37 CFR Section 1.56.

Whereas, the undersigned inventor(s) has/have made certain inventions, improvements, and discoveries (herein referred to as the "Invention") disclosed in the above-identified patent application and further identified by Docket Number provided above in the header of this document;

Whereas, Lenovo (Singapore) Pte. Ltd., a corporation of Singapore, having a place of business at 151, Lorong Chuan, Singapore 556741, (hereinafter called Lenovo), desires to acquire the entire right, title and interest in the application and invention, and to any United States and foreign patents to be obtained therefor;

Now therefore, for a valuable consideration, receipt whereof is hereby acknowledged, I/we, the above named, hereby acknowledge my/our prior existing obligation and hereby sell, assign, and transfer to Lenovo, its successors and assigns, the entire right, title and interest in the application and invention therein disclosed for the United States and foreign countries, and all rights of priority resulting from the filing of the United States application, and I/we request the Commissioner of Patents to issue any Letters Patent granted upon the invention set forth in the application to Lenovo, its successors and assigns; and I/we hereby agree that Lenovo may apply for foreign Letters Patent on the invention and I/we will execute all papers necessary in connection with the United States and foreign applications when called upon to do so by Lenovo.

The undersigned hereby grants permission to insert any further identification which may be necessary or desirable in order to comply with the rules of the U.S. Patent and Trademark Office.

The undersigned hereby covenants that no assignment, sale, agreement or encumbrance has been or will be made or entered into which would conflict with this assignment.

I hereby acknowledge that any willful false statement made in this declaration is punishable under 18 U.S.C. 1001 by fine or imprisonment of not more than five (5) years, or both.

(I) Legal Name of Inventor: John Doe

Signature: _____

Date: _____

---

I hereby acknowledge that any willful false statement made in this declaration is punishable under 18 U.S.C. 1001 by fine or imprisonment of not more than five (5) years, or both.

(II) Legal Name of Inventor: Jane Deer

Signature: _____

Date: _____

FIG. 5

Registration List

| First Name | Last Name | Address | City | State | Zip |
|---|---|---|---|---|---|
| John | Doe | 1630 Revello Drive | Sunnydale | CA | 95876 |
| Jane | Deer | 1329 Carroll Ave | Los Angeles | CA | 90210 |
| Jack | Spratt | 320 Fowler | Lynbrook | NY | 35258 |
| Peter | Piper | 711 Maple Street | St. Louis | MO | 66478 |
| Grumpy | Cat | 1882 Gerard Street | New York | NY | 35124 |
| Bo | Peep | 31 Spooner Street | Quahog | RI | 12589 |
| Doc | Brown | 1640 Riverside Drive | Hill Valley | CA | 95212 |

| Amount Deposited | Amount Still Owed |
|---|---|
| $300.00 | $700.00 |
| $200.00 | $800.00 |
| $100.00 | $900.00 |
| $450.00 | $550.00 |
| $600.00 | $400.00 |
| $100.00 | $900.00 |
| $150.00 | $850.00 |

FIG. 6

METHODS AND DEVICES FOR MANAGING PRINTING OF CONTENT

BACKGROUND

Embodiments herein generally relate to methods and devices for managing printing of content.

Conventionally, an application implemented on a client device transmits a request to print content to a printing device directly or, indirectly, through a network. Requests to print content typically include printable data representative of a document and/or an image. Upon receiving the request to print content, the printing device executes the request to print content in accordance with printing settings and generates the printed output.

Printing settings include selected types of printing attributes, or values for types of printing attributes, associated with a request to print content. Types of printing attributes for printable data include color attributes, simplex/duplex attributes, layouts of the printable data, scaling of printable data, a number of copies of the printed data, and the like. Printing settings may be implemented in various manners. For example, printing settings may be implemented by selecting types of printing attributes, or values associated with types of printing attributes, on one or more of the printing device, a printer driver associated with the printing device, the application originating the request to print content, or in metadata associated with the printable data and/or the request to print content, and the like. Typically, when a print job is created by a user, the application displays a dialog box that displays the printing device settings corresponding to the request to print content.

However, problems may arise when the printing attributes that are actually implemented by the printing device do not match the user's expectation for the printed output. For example, the user may overlook a default or last-used printing device setting, resulting in a printed output that the user did not expect. Alternatively, conflicts between printing settings and/or preferences may be resolved by the printing device and/or a policy implemented on the network that is inconsistent with the user's expectation for the printed output. For example, if the user generates a request to print a document anticipating simplexed printed output but the printing device generates duplexed printed output, the user may overlook portions of the printed output or conclude that the request was corrupted.

Accordingly, a need remains for methods, devices, and computer program products managing printing of content that reduces or eliminates inconsistencies between printed output and user expectations for printed output.

SUMMARY

In accordance with embodiments herein, a computer implemented method for managing printing of content on a printing device is provided. The method operates under control of one or more processors configured with specific executable program instructions. The method includes analyzing a request to print content to determine one or more characteristic of interest (COI) associated with the request. The request to print content includes printable data representative of one or more of a document and an image. The method identifies types of printing attributes associated with the request. The types of printing attributes include printing settings and a duplex setting to be implemented at the printing device in connection with generating printed output. The duplex setting is a field having an "ON" status and an "OFF" status. The method determines a user duplex expectation (UDE) status with respect to the one or more COI. The method manages addition of a duplex indicia (DI) to the printed output based on the determining and processes the request.

Optionally, the duplex setting may direct the printing device to generate the printed output on both sides of a printable medium based on the "ON" status. The UDE status may indicate that a user may not intend or not expect for the printed output to be duplexed. The managing may include turning on a DI attribute to direct the printing device to add the DI to the printed output on at least one of the sides of the printable medium. The managing may include adding the DI to the printable data such that the DI is printed on at least one of the sides of the printable medium. The one or more COI may include one or more of types of documents, document characteristics, applications, printing device locations, computing devices, operating systems, resource state of the printing device, printing device-based modifications to user-selected printing settings, printing network policy-based modifications to user-selected printing settings, and operating systems associated with the request to print content. The managing may include positioning the DI relative to the printable data with respect to a first side of at least one printable medium. The positioning may include positioning the DI relative to the printable data based on one or more of a type of language or types of document elements of the printable data. The DI may include one or more of a printed message, icon, graphic, mark, token, and watermark applied to at least a first side of a printable medium that indicates the presence of a portion of the printed data on a second side of the printable medium.

In accordance with embodiments herein, a device is provided. The device includes an input to receive a user instruction to perform an action, one or more processors, and a memory storing program instructions accessible by the processor. The one or more processors, responsive to execution of the program instructions, analyze a request to print content to determine one or more characteristic of interest (COI) associated with the request. The request to print content includes printable data representative of one or more of a document and an image. The one or more processors identify types of printing attributes associated with the request. The types of printing attributes include printing settings and a duplex setting to be implemented at the printing device in connection with generating printed output. The duplex setting is a field having an "ON" status and an "OFF" status. The one or more processors determine a user duplex expectation (UDE) status with respect to the one or more COI. The one or more processors manage addition of duplex indicia (DI) to the printed output based on the determining and process the request.

Optionally, the duplex setting may direct the printing device to generate the printed output on both sides of a printable medium based on the "ON" status. The UDE status may indicate that a user may not intend or not expect for the printed output to be duplexed. The one or more processors, as part of the manage, may turn on a DI attribute to direct the printing device to add the DI to the printed output on at least one of the sides of the printable medium. The one or more processors, as part of the manage, may add the DI to the printable data such that the DI is printed on at least one of the sides of the printable medium. The one or more COI may include one or more of types of documents, document characteristics, applications, printing device locations, computing devices, operating systems, resource state of the printing device, printing device-based modifications to user-selected printing settings, printing network policy-based modifications to user-selected printing settings, and operating systems associated with the request to print content. The one or more processors, as part of the manage, may position the DI relative to the printable data with respect to at least one side of the printable medium. The DI may include one or more of a printed message, icon, graphic, mark, token, and watermark applied to at least a first side of a printable medium that indicates the presence of a portion of the printed data on a second side of the printable medium.

In accordance with embodiments herein, a computer program product comprising a non-signal computer readable storage medium comprising computer executable code is provided. The computer program product analyzes a request to print content to determine one or more characteristic of interest (COI) associated with the request, the request to print content including printable data representative of one or more of a document and an image. The computer program product identifies types of printing attributes associated with the request. The types of printing attributes include printing settings and a duplex setting to be implemented at the printing device in connection with generating printed output. The duplex setting is a field having an "ON" status and an "OFF" status. The computer program product determines a user duplex expectation (UDE) status with respect to the one or more COI. The computer program product manages addition of duplex indicia (DI) to the printed output based on the determining; and processes the request.

Optionally, the duplex setting may direct the printing device to generate the printed output on both sides of a printable medium based on the "ON" status. The UDE status may indicate that a user may not intend or not expect for the printed output to be duplexed.

DESCRIPTION OF THE DRAWINGS

FIG. 5 illustrates one example of printed output in accordance with embodiments herein.

FIG. 6 illustrates another example of printed output in accordance with embodiments herein.

DETAILED DESCRIPTION

Figure 1:
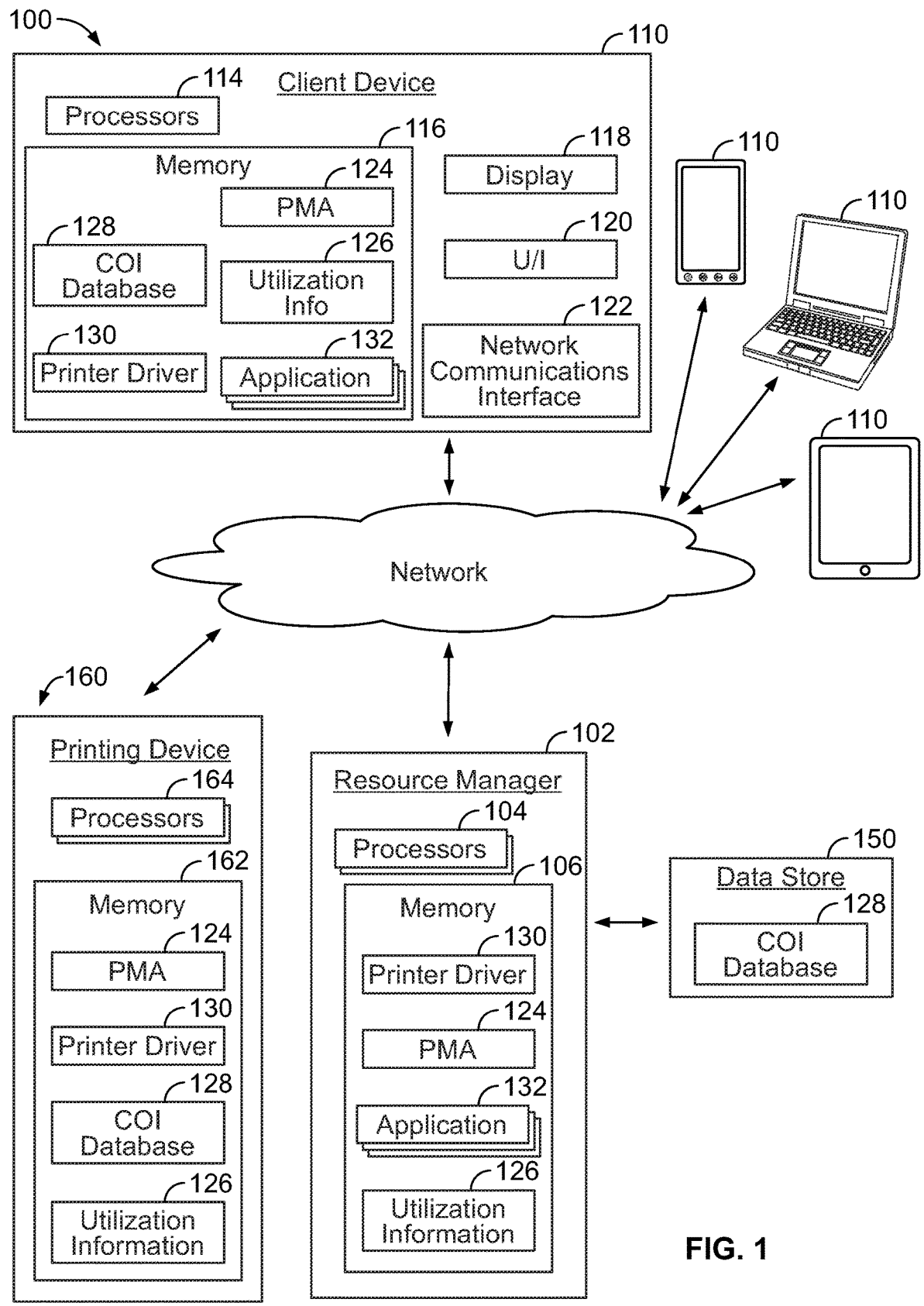
FIG. 1 illustrates a system for managing printing of content implemented in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "printing device" refers to any component, device, and/or system that includes various capabilities for processing printable data representative of a document and/or an image, handling printable media, and generating printed output on a printable medium. These various capabilities generally include receiving a request to print content, including printable data, from an application and at least one printable medium from a printable media source, and printing or otherwise registering the printable data on the at least one printable medium. Printing or otherwise registering the printable data on the at least one printable medium may include mechanically manipulating the at least one printable medium with a duplexer to effect printing on both sides of the at least one printable medium. Examples of printing devices include printers, multifunction devices capable of printing, and the like.

The term "printing driver" refers to any application program designed to enable other programs to work with a particular printing devices without concerning themselves with the specifics of the hardware and internal "language" of the printing device. Application programs may communicate properly with a variety of printing devices by using printer drivers, which handle all of the subtleties of each printing device.

The term "duplex" shall mean double-sided. For example, printing on two sides of a printable medium is referred to as duplex or two-sided printing. In another example, duplexed printed output refers to printed output having printable data appearing on two sides of the printable medium.

The term "simplex" shall mean single-sided. For example, printing on one side and no other side of a printable medium is referred to as simplex or one-sided printing. In another example, simplexed printed output refers to printed output having printable data appearing on only one side of the printable medium.

The term "duplex setting" shall refer to a type of printing attribute associated with a request to print content that determines whether the printing device generates duplexed or simplexed printed output. The duplex setting is a field having an "ON" and an "OFF" status. Based on selecting the ON status of the duplex setting, the printing device generates duplexed printed output. Based on selecting the OFF status of the duplex setting, the printing device generates simplexed printed output. Based on selecting the ON status for the duplex setting, a flipping edge setting may be activated. The flipping edge setting is a field having a "long edge" and a "short edge" status. Based on selecting the long edge status of the flipping edge setting, the printing device will flip the printable media along a long edge of the printable media. For example, selecting the long edge status for the flipping edge setting for a document printed in a portrait orientation arranges the duplexed printed output to be turned from side-to-side like a book. Based on selecting the short edge status of the flipping edge setting, the printing device will flip the printable media along a short edge of the printable media. For example, selecting the short edge status for the flipping edge setting for a document printed in landscape mode arranges the duplexed printed output to be flipped vertically, as in a top-bound notepad.

The terms "duplex indicia" and "DI" refer to any sign, indication, and/or distinctive mark applied to a first side of the printable medium and that is intended to alert the user to content printed on a reverse side of the printable medium. DI may include, for example and without limitation, printed messages, icons, graphics, marks, tokens, watermarks, and the like.

System Overview

FIG. 1 illustrates a system 100 for managing printing of content implemented in accordance with embodiments herein. The system includes one or more client devices 110 having one or more application program(s) 132 implemented thereon capable of generating requests to print content and one or more printing devices 160 capable of receiving requests to print content and generating printed output on a printable medium based thereon. The system 100 also includes one or more resource managers 102 that manage and otherwise provide access to one or more data stores 150. The resource manager 102 communicates with client devices 110 through one or more networks 112 to provide access to the data store 150. The network 112 may represent the World Wide Web, a local area network, a wide area network and the like. The client device 110 may represent various types of electronic devices including, but not limited to, personal computers, tablet devices, laptop computers, and the like. The resource manager 102 may represent a server or other network-based or cloud-based computing environment. The resource manager 102 may represent a single computer system or a collection of computer systems located at a common location or geographically distributed.

The client device 110 includes one or more processors 114, memory 116, a display 118, a user interface 120, a network communications interface 122, and various other mechanical components, electrical circuits, hardware and software to support operation of the client device 110. The memory 116 includes an operating system and instructions to implement the processes described herein. The memory 116 also stores one or more print request-generating applications (PRGAs) 132, a printing management module (PMM) 124 to implement managing printing of content, and, optionally, a printing driver application 130, as well as other software, information and data as described herein. For example, the memory 116 may maintain utilization information 126 related to the load experienced by and/or levels of available resources corresponding to the one or more printing devices 160, and a characteristic of interest (COI) database 128. The COI database 128 includes a list of the plurality of COI and a corresponding user duplex expectation (UDE status) or a non-UDE status associated with each of the plurality of COI. The COI database 128 may be implemented in any manner of data sources, such as data bases, text files, data structures, libraries, relational files, flat files and the like. The one or more processors 114 may update the utilization information 126 periodically based changes in the availability of the one or more printing devices 160 and/or on changes in the load experienced by and/or levels of available resources corresponding to the one or more printing devices 160. Additionally or alternatively, the one or more processors 114 may update the COI database 128 periodically based on changes in the duplex setting status for one or more of the plurality of COI in the COI database 128 and/or to update the number and types of COI included in the COI database 128. Additionally or alternatively, the one or more processors 114 may receive updates to the COI database 128 and/or utilization information 126 pushed to the client device 110 by the resource manager 102.

The PRGA 132 generates a request to print content in response to a user invoking a printing function. The PRGA 132 may utilize a graphical user interface (GUI) that includes a viewing window within which documents and/or images are displayed and a toolbar with selectable buttons for invoking commonly used functions such as a printing function. Examples of PRGAs include, for example and without limitation, word processing applications, spreadsheet applications, presentation applications, calendar applications, notetaking applications, desktop publishing applications, database management applications, project management applications, diagram and flowcharting applications, graphic design applications, portable document format (PDF) viewing and/or editing applications, photograph viewing and/or editing applications, and the like. Based on a user invoking the printing function, the PRGA 132 may display a window within which various printing settings (such as number of copies, destination printer, duplex settings, color attributes, and the like) may be altered from default and/or last used settings. After the printing settings are modified or not by the user, the user may select a "PRINT" button from the window to cause the PRGA 132 to generate and transmit the request to print content and printing settings to the PMM 124. The request to print content includes printable data representative of one or more of a document or an image.

The PMM 124 receives the request to print content from the PRGA 132, analyzes the request to determine one or more COI associated with the request, and identifies types of printing attributes associated with the request. The PMM 124 determines one or more COI by determining, for example and without limitation, one or more of types of documents, document characteristics, applications, printing device locations, computing devices, operating systems, resource states of the printing device, printing device-based modifications to user-selected printing settings, printing network policy-based modifications to user-selected printing settings, operating systems associated with the request to print content, and the like. In one example, the one or more COI includes a first type of document (e.g., a PowerPoint presentation) and a second type of document (e.g., a Word document). In an additional or alternative example, the one or more COI includes a type of resource state (e.g., a level or amount of available printable media of a printing device falling below a threshold level). The PMM 124 identifies types of printing attributes associated with the request including printing settings and a duplex setting to be implemented at the printing device in connection with generating printed output. The duplex setting is a field having an "ON" status and an "OFF" status.

The PMM 124 determines a UDE status associated with respect to the one or more COI. Each of the one or more COI corresponds to either a UDE status or a non-UDE status. A UDE status indicates that a user may not intend and/or not expect for the printed output to be duplexed. A non-UDE status indicates that a user may intend and/or expect for the printed output to be duplexed. The PMM 124 may determine the UDE status by utilizing the COI database 128 to look up the one or more COI to identify the UDE status corresponding to the one or more COI. In one example, the PMM 124 determines that a first type of document (e.g., a PowerPoint presentation) is associated with the UDE status, reflecting that the user may not intend and/or not expect for the printed output to be duplexed. Additionally or alternatively, the PMM 124 determines that a second type of document (e.g., a Word document) is associated with the non-UDE status, reflecting that the user may intend and/or expect for the printed output to be duplexed. In another example, the PMM 124 determines that a type of resource state (e.g., a level or amount of available printable media of a printing device falling below a threshold level) is associated with the UDE status, reflecting that the user may not intend and/or not expect duplexed printed output. For example, a user may select a simplex printing setting (or select the "OFF" status for the duplex setting) or otherwise expect simplex printed output, but, based on a level or amount of available printable media at the printing device falling below a threshold level, the "ON" status of the duplex setting may be implemented in order to generate the entire printed output.

The PMM 124, based on determining the UDE status, manages addition of a duplex indicia (DI) to the printed output, and processes the request. The PMM 124 may manage addition of the DI by turning on a DI attribute to direct the printing device to add the DI to the printed output on at least one of the sides of the printable medium. For example, turning on the DI attribute may result in the DI being applied to a first side of a printable medium to indicate the presence of a portion of the printed data on a second side of the printable medium. Additionally or alternatively, the PMM 124 may manage addition of the DI by adding the DI to the printable data such that the DI is applied to the printed output on at least one of the sides of the printable medium. The DI includes, for example and without limitation, one or more of a printed message, icon, graphic, mark, token, watermark, and the like. For example, based on determining that a first type of document (e.g., a PowerPoint presentation) is associated with a UDE status of the duplex setting, the PMM 124 implements the DI attribute resulting in a DI being applied to at least a first side of a first page of the printed output to alert the user to content printed on at least the second side of the first page. Additionally or alternatively, based on determining that a second type of document (e.g., a Word document) is associated with an non-UDE status of the duplex setting, the PMM 124 does not implement the DI attribute and a DI is not applied the printed output because the user may intend and/or expect duplexed printed output. In another example, based on determining that a first type of resource state (e.g., a level or amount of available printable media of a printing device falling below a threshold level) is associated with a UDE status of the duplex setting, the PMM 124 implements the DI attribute resulting in a DI being applied to at least a first side of a first page of the printed output to alert the user to content printed on at least the second side of the first page.

The printing driver application 130 receives the request to print content from the PMM 124 and generates printer-specific data acceptable to the destination printing device based on the request. The printer-specific data is transmitted to the printing device, which generates printed output on the printable medium.

The resource manager 102 includes one or more processors 104 and memory 106, among other structures that support operation of the resource manager 102. In accordance with additional or alternative embodiments herein, all or portions of the PMM 124 or the printing driver application 130 may be implemented on the resource manager 102. The memory 106 includes an operating system, instructions to manage the data store 150 and instructions to implement the methods described herein. The memory 106 may also store one or more print request-generating applications (PRGAs) 132, the PMM 124, and, optionally, the printing driver application 130, as well as other software, information and data as described herein. For example, the memory 106 may maintain utilization information 126 related to the load experienced by and/or levels of available resources corresponding to the one or more printing devices 160, and the COI database 128. The resource manager 102 may maintain the COI database 128 and push updates to the client device 110 and/or the printing device 160.

The printing device 160 includes one or more processors 164 and memory 162, among other structures that support operation of the resource manager 160. In accordance with additional or alternative embodiments herein, all or portions of the PMM 124 or the printing driver application 130 may be implemented on the printing device 160. The memory 162 includes an operating system and instructions to implement the methods described herein. The memory 162 may also store the PMM 124 and the printing driver application 130, as well as other software, information and data as described herein. For example, the memory 162 may maintain utilization information 126 related to the load experienced by and/or levels of available resources corresponding to the one or more printing devices 160 and, optionally, the COI database 128.

Figure 2:
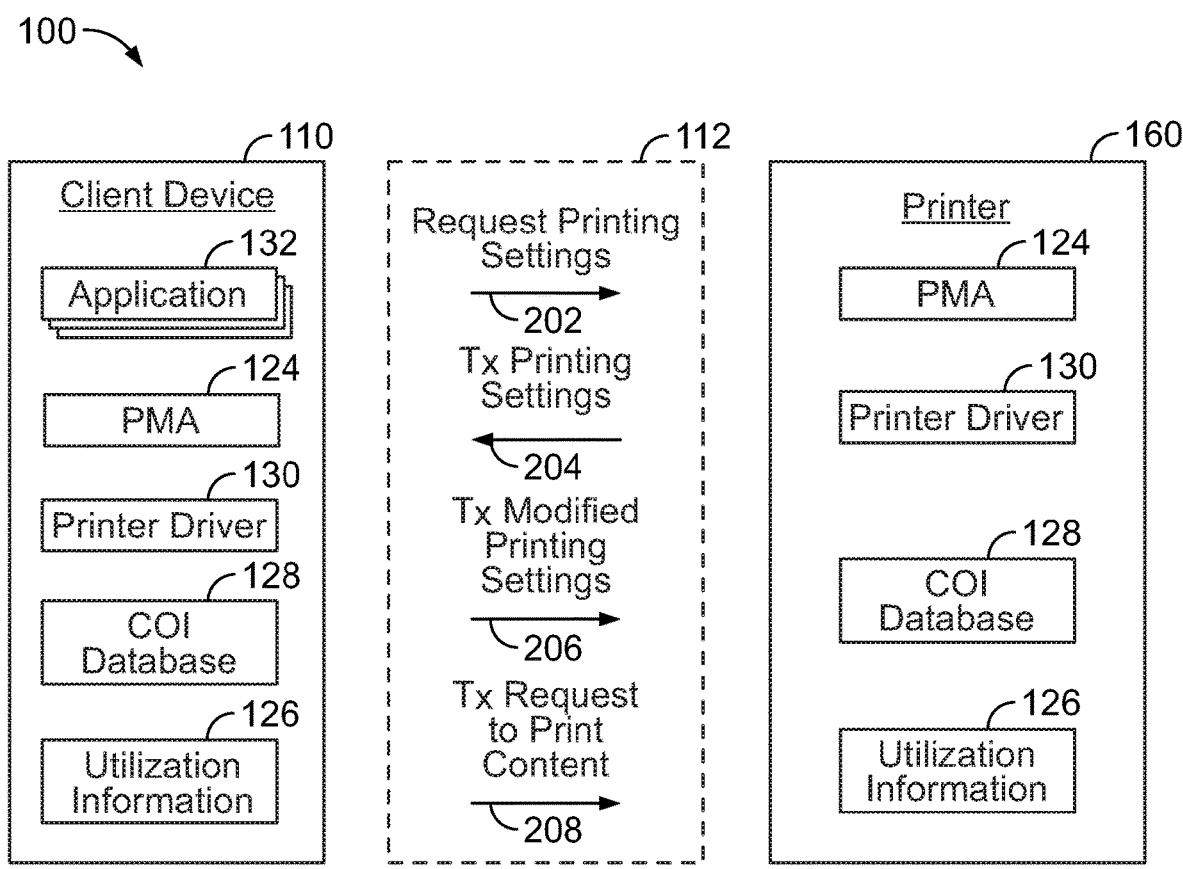
FIG. 2 illustrates a functional diagram of portions of the system of FIG. 1 as well as a first example of certain data, information, and content conveyed in accordance with embodiments herein.

FIG. 2 illustrates a functional diagram of portions of the system of FIG. 1 as well as a first example of certain data, information, and content conveyed in accordance with embodiments herein. In FIG. 2, the system 100 is implemented as described herein to run the PMM 124 on the client device 110. The client device 110 and printing device 160 communicate on a periodic basis only and in response to the PRGA 132 transmitting a request to print content to the PMM 124. For example, at 202, the client device 110 transmits a request for printing settings and, optionally, utilization information 126 to the printing device 160 over the network 112. The printing device stores default and/or last-used printing settings and utilization information 126 related to the amounts and/or levels of resources available at the printing device 160. At 204, the printing device 160 transmits the printing settings and, optionally, utilization information 126 to the client device 110 over the network 112. The client device 110, at the PMM 124, analyzes the request to print content received from the PRGA 132, identifies the duplex setting associated with the request, determines the status of the duplex setting with respect to the one or more COI, and manages the DI attribute in the printing settings, and processes the modified printing settings to the printer driver application 130. At 206 and 208, the client device 110 transmits the modified printing settings and the request to print content to the printing device 160. Based on receiving the modified printing settings and the request to print content, the printing device 160 generates the printed output.

Figure 3:
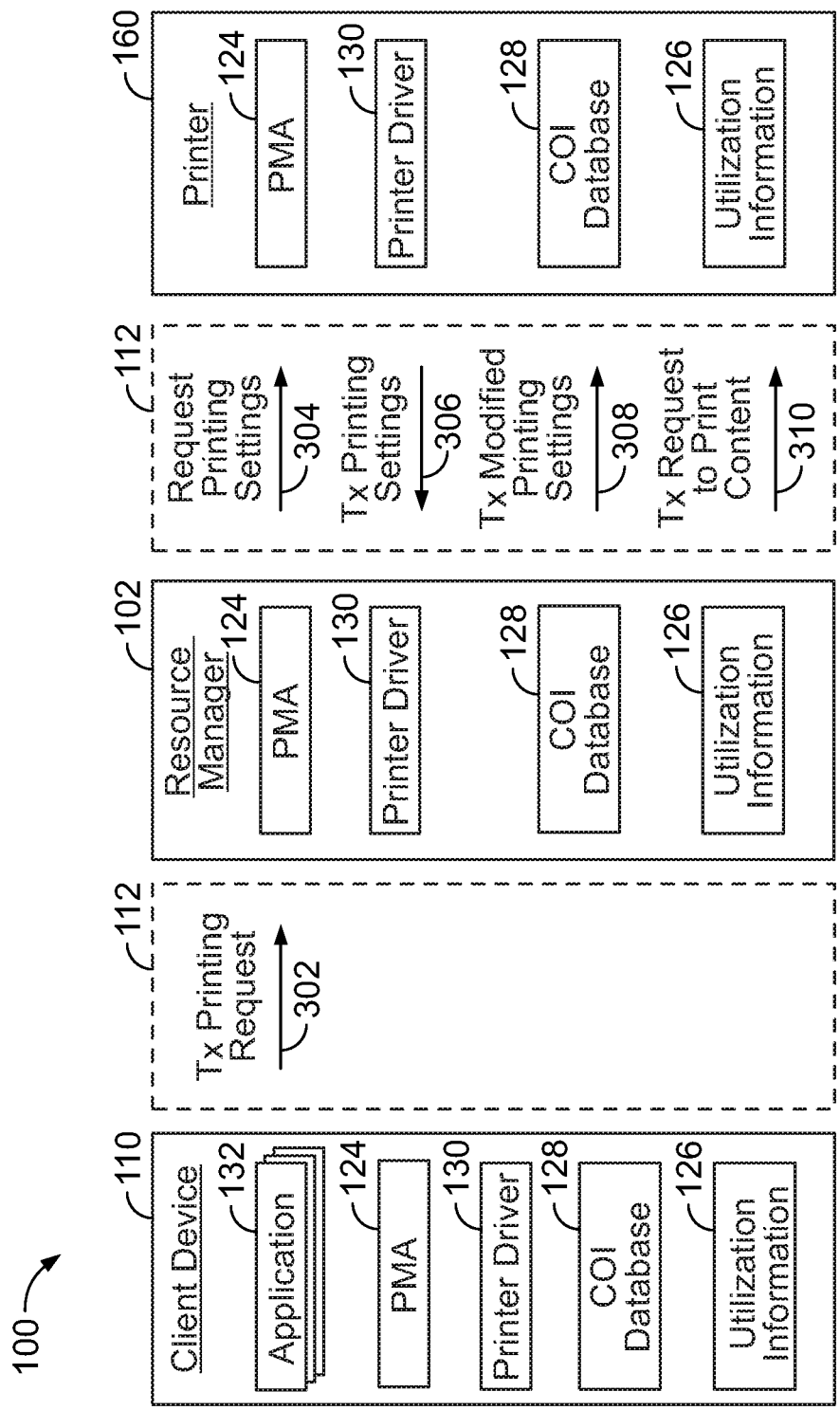
FIG. 3 illustrates a functional diagram of portions of the system of FIG. 1 as well as a second example of certain data, information, and content conveyed in accordance with embodiments herein.

FIG. 3 illustrates a functional diagram of portions of the system of FIG. 1 as well as a first example of certain data, information, and content conveyed in accordance with embodiments herein. In FIG. 3, the system 100 is implemented as described herein to run the PMM 124 on the client device 110. The client device 110, resource manager 102, and printing device communicate on a periodic basis only.

For example, at 302, the client device 110 transmits a request to print content to the resource manager 102. At 304, in response to receiving the request, the resource manager 102 transmits a request for printing settings and, optionally, utilization information 126 to the printing device 160 over the network 112. The printing device stores default and/or last-used printing settings and utilization information 126 related to the amounts and/or levels of resources available at the printing device 160. At 306, the printing device 160 transmits the printing settings and, optionally, utilization information 126 to the resource manager 102 over the network 112. The resource manager 102, at the PMM 124, analyzes the request to print content received from the PRGA 132, identifies the duplex setting associated with the request, determines the status of the duplex setting with respect to the one or more COI, and manages the DI attribute in the printing settings, and processes the modified printing settings to the printing driver application 130. At 308 and 310, the resource manager 102 transmits the modified printing settings and the request to print content to the printing device 160. Based on receiving the modified printing settings and the request to print content, the printing device 160 generates the printed output.

Process for Managing Printing of Content

Figure 4:
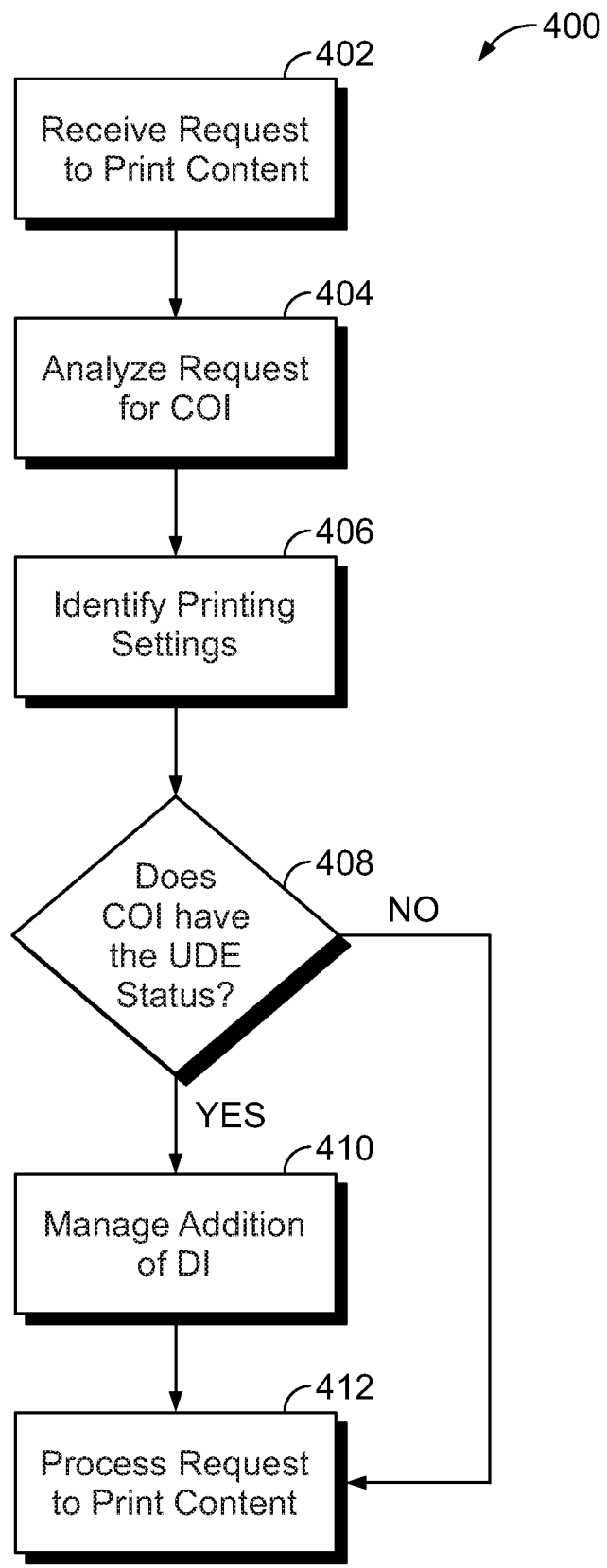
FIG. 4 illustrates an example processes for managing printing of content in accordance with embodiments herein.

FIG. 4 illustrates a process 400 for managing printing of content in accordance with embodiments herein. The operations of FIG. 4 may be implemented by processors (e.g., the processors 104, 114, and 164), hardware and circuits within the systems described in the various embodiments herein. The operations of FIG. 4 may be performed continuously or periodically. For simplicity purposes, the operations of FIG. 4, will be described in connection with one request, however it is recognized that the client device 110 may provide multiple requests in connection with managing printing of content. Optionally, the operations of FIG. 4 may be performed in parallel for multiple client devices 110 on one or more resource managers 102.

At 402, one or more processors receive a request to print content. The request may be generated in connection with a user invoking a printing function and from various types of PRGAs 132 implemented on the client device 110. For example, based on the user invoking a printing function, the PRGA 132 may display a window within which various printing settings (e.g., number of copies, destination printing device, duplex settings, color attributes, and the like) may be altered from default and/or last used settings. After the printing settings are modified or not by the user, the user may select a "PRINT" button from the window to cause the PRGA 132 to generate and transmit the request to print content and the printing settings.

At 404, the one or more processors analyze the request to print content to determine one or more COI associated with the request. The request to print content includes, among other things, printable data representative of one or more of a document and an image. The one or more processors, at the PMM 124, determine one or more COI corresponding to the request by determining, for example and without limitation, a type of document, document characteristics, a type of application, a printing device location, a type of computing devices, a type of operating system, one or more resource states of the printing device, types of printing device-based modifications to user-selected printing settings, types of printing network policy-based modifications to user-selected printing settings associated with the request to print content, and the like. In one example, the one or more COI includes a first type of document (e.g., a spreadsheet), a second type of document (e.g., a Word document). In an additional or alternative example, the one or more COI includes a document characteristic (e.g., occurrence of a signature block, terms typically used in drafting legal agreements). In an additional or alternative example, the one or more COI includes a resource state (e.g., a level or amount of available printable media of a printing device falling below a threshold level).

At 406, the one or more processors types of printing attributes associated with the request, the types of printing attributes including printing settings and a duplex setting to be implemented at the printing device in connection with generating printed output. The duplex setting is a field having an "ON" status and an "OFF" status. The duplex setting directs the printing device to generate the printed output on both sides of the printable medium based on the "ON" status. The "ON" status of the duplex setting may have been selected by or overlooked by the user in the PRGA 132. Additionally or alternatively, one or more of the printing driver, the printing device, the resource manager, or a policy implemented on the network may implement "ON" status of the duplex setting in the printing settings without the user knowing or expecting duplexed printed output. In one example, a user may select a simplex setting (or select the "OFF" status of the duplex setting) but, based on conflicting and/or higher priority printing device settings, the "ON" status of the duplex setting is implemented in the printing settings without the user's knowledge.

At 408, the one or more processors determine the UDE status associated with respect to the one or more COI. The one or more processors, at the PMM 124, may determine the UDE status by utilizing the COI database 128 to look up the one or more COI to identify the UDE status corresponding to the one or more COI. Each of the one or more COI corresponds to either a UDE status or a non-UDE status. The UDE status of the duplex setting with respect to the one or more COI indicates that a user may not intend and/or not expect duplexed printed output. The non-UDE status of the duplex setting with respect to the one or more COI indicates that a user may intend and/or expect duplexed printed output. In one example, the one or more processors determine that a first type of document (e.g., a spreadsheet) to be a COI that is associated with a UDE status. The UDE status of the first type of document indicates that a user may not expect and/or not intend for portions of the spreadsheet to appear on the second side of the printed media. Additionally or alternatively, the one or more processors determine that a second type of document (e.g., a Word document) to be a COI associated with a non-UDE status. The non-UDE status of the second type of document indicates that a user may expect and/or intend for portions of the spreadsheet to appear on the second side of the printed media. In an additional or alternative example, the one or more processors determine a document characteristic (e.g., occurrence of a signature block, terms typically used in drafting legal agreements) to be a COI that is associated with a UDE status of the duplex setting. The UDE status of the document characteristic indicates that a user may not expect and/or intend for portions of the printable data to appear on the second side of the printed media. In an additional or alternative example, the one or more processors determine that a resource state (e.g., a level or amount of available printable media of a printing device falling below a threshold level) to be a COI that is associated with a UDE status. The UDE status of the resource state indicates that a user may not expect and/or not intend for portions of the printable data to appear on the second side of the printed media. For example, a user may select a simplex printing setting (or not select a duplex setting) or otherwise expect simplex printed output, but, based on a level or amount of available printable media at the printing device falling below a threshold level, an "ON" status of the duplex setting may be implemented in order to generate the entire printed output. Based on the one or more processors determining a UDE status with respect to the one or more COI, flow branches to 410. Based on the one or more processors determining the non-UDE status of the duplex setting with respect to the one or more COI, flow branches to 412.

At 410, the one or more processors manage addition of a duplex indicia (DI) to the printed output. The one or more processors may manage addition of the DI by turning on a DI attribute to direct the printing device to add the DI to the printed output on at least one of the sides of the printable medium. For example, turning on the DI attribute may result in the DI being applied to a first side of a printable medium to indicate the presence of a portion of the printed data on a second side of the printable medium. Additionally or alternatively, the one or more processors may manage addition of the DI by adding the DI to the printable data such that the DI is applied to the printed output on at least one of the sides of the printable medium. The DI includes, for example and without limitation, one or more of a printed message, icon, graphic, mark, token, watermark, and the like. The one or more processors may also manage the DI attribute by positioning the DI relative to the printable data with respect to the first side of at least one printable medium. Positioning the DI relative to the printable data may include positioning the DI relative to the printable data based on one or more of a type of language or types or positions of document elements of the printable data. For example, based on a type of language of the printable data corresponding to a right-to-left writing system and/or script (e.g., Arabic, Hebrew, Persian, Chinese, Japanese, and the like), the DI may be positioned to the left-top or the left-bottom margin with respect to the printable data in order to alert a user to additional content on the second side of the page at the end of the text. In an additional or alternative example, based on the printable data includes document elements extending into the top and left margins with respect to the printable area of the printable media, the DI may be positioned on either the bottom or right margins with respect to the printable area.

At 412, the one or more processors process the request to print content and the printing settings. The request to print content is transmitted to the printing driver application. The printing driver application 130 receives the request to print content from the PMI 124 and generates printer-specific data acceptable to the destination printing device based on the request. The printer-specific data is transmitted to the printing device, which generates the printed output in accordance with the printing settings.

FIG. 5 illustrates one example of a printed output 500 in accordance with embodiments herein and that results from the operations of FIG. 4 as follows. Based on a user invoking a printing function of a word processing application, a request to print content is generated in accordance with operation 402. The one or more processors analyze the request to print content and determine the one or more COI to include a document characteristic corresponding to a signature block 502 in accordance with operation 404. The one or more processors identify the "ON" status for the duplex printing setting in accordance with operation 406. Based thereon, the one or more processors determine of the UDE status with respect to the signature block 502. For example, the one or more processors access the COI database 128 and determine that the signature block 502 corresponds to a UDE status in accordance with operation 408. The one or more processors manage addition of the DI 504 by implementing the DI 504 as part of the printing settings or by adding the DI 504 to the printable data. Implementing the DI causes the DI 504 to be applied to at least a first side 506 of at least one printable medium to indicate the presence of a portion of the printable data on the second side 508 of the printable medium. Optionally, based on a type of language corresponding to a left-to-right writing system, the one or more processors position the DI with respect to the printable data in the upper, right corner of at least the first printable medium. Accordingly, a user is alerted to content appearing on the second side 508 of the printable medium and does not fail to, e.g., obtain all of the signatures required for the document.

FIG. 6 illustrates one example of a printed output 600 in accordance with embodiments herein and that results from the operations of FIG. 4 as follows. Based on a user invoking a printing function of a spreadsheet application, a request to print content is generated in accordance with operation 402. The one or more processors analyze the request to print content and determine the one or more COI to include a type of document corresponding to a spreadsheet 602 in accordance with operation 404. The one or more processors identify the "ON" status for the duplex printing setting in accordance with operation 406. Based thereon, the one or more processors determine of the UDE status with respect to the spreadsheet 602. For example, the one or more processors access the COI database 128 and determine that the spreadsheet 602 corresponds to the UDE status in accordance with operation 408. The one or more processors manage addition of the DI 604 by implementing the DI 604 as part of the printing settings or by adding the DI 604 to the printable data. Implementing the DI causes the DI 604 to be applied to at least a first side 606 of at least one printable medium to indicate the presence of a portion of the printable data on the second side 608 of the printable medium. Accordingly, a user is alerted to printable data appearing on the second side 608 of the printable medium and does not overlook the printable data appearing on the second side 608 or conclude that the request was corrupted and unnecessarily repeat the request to print content.

Closing Statements

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general-purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming.

The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, the claim limitation "associated with one or more of the client device and a user of the client device" means and shall encompass i) "associated with the client device", ii) "associated with a user of the client device" and/or iii) "associated with both the client device and a user of the client device". For the avoidance of doubt, the claim limitation "one or more of touch, proximity sensing, gesture or computer vision" means and shall encompass i) "touch", ii) "proximity", (iii) "sensing", (iv) "gesture", and/or (iv) "computer vision" and any sub-combination thereof.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method for managing printing of content on a printing device, the method comprising:
    under control of one or more processors configured with specific executable program instructions:
    analyzing a request to print content to determine one two or more characteristic of interest (COI) associated with the request, the request to print content including printable data representative of one or more of a document and an image;
    identifying types of printing attributes associated with the request, the types of printing attributes including printing settings and a duplex setting to be implemented at the printing device in connection with generating printed output, wherein the duplex setting is a field having an "ON" status and an "OFF" status;
    wherein the duplex setting has the "ON" status;
    determining a user duplex expectation (UDE) status with respect to the duplex setting and the one or more COI;
    managing addition of a duplex indicia (DI) to the printed output based on the determining; and
    processing the request;
    wherein processing the request includes providing only simplex indicia to the printed output when the duplex setting has the "ON" status based on the UDE status.

2. The method of claim 1, wherein the duplex setting directs the printing device to generate the printed output on both sides of a printable medium based on the "ON" status.

3. The method of claim 1, wherein when the duplex setting has the "OFF" status, the UDE status is determined to add the DI to the printed output.

4. The method of claim 3, wherein the managing further comprises turning on a DI attribute to direct the printing device to add the DI to the printed output on at least one of the sides of the printable medium.

5. The method of claim 3, wherein the managing further comprises adding the DI to the printable data such that the DI is printed on at least one of the sides of the printable medium.

6. The method of claim 1, wherein the one or more COI include one or more of types of documents, document characteristics, applications, printing device locations, computing devices, operating systems, resource state of the printing device, printing device-based modifications to user-selected printing settings, printing network policy-based modifications to user-selected printing settings, and operating systems associated with the request to print content.

7. The method of claim 1, wherein the managing further comprises positioning the DI relative to the printable data with respect to a first side of at least one printable medium.

8. The method of claim 7, wherein positioning further comprises positioning the DI relative to the printable data based on one or more of a type of language or types of document elements of the printable data.

9. The method of claim 1, wherein the DI includes one or more of a printed message, icon, graphic, mark, token, and watermark applied to at least a first side of a printable medium that indicates the presence of a portion of the printed data on a second side of the printable medium.

10. A device, comprising:
    one or more processors;
    a memory storing program instructions accessible by the processor, wherein, responsive to execution of the program instructions, the one or more processors perform the following:
    analyze a request to print content to determine one or more characteristic of interest (COI) associated with the request, the request to print content including printable data representative of one or more of a document and an image;
    identify types of printing attributes associated with the request, the types of printing attributes including printing settings and a duplex setting to be implemented at the printing device in connection with generating printed output, wherein the duplex setting is a field having an "ON" status and an "OFF" status;
    wherein the duplex setting has the "ON" status;
    determine a user duplex expectation (UDE) status with respect to the duplex setting and the one or more COI;
    manage addition of duplex indicia (DI) to the printed output based on the determining; and
    process the request;
    wherein processing the request includes providing only simplex indicia to the printed output when the duplex setting has the "ON" status based on the UDE status.

11. The device of claim 10, wherein the duplex setting directs the printing device to generate the printed output on both sides of a printable medium based on the "ON" status.

12. The device of claim 10, wherein when the duplex setting has the "OFF" status, the UDE status is determined to add the DI to the printed output.

13. The device of claim 12, wherein the one or more processors, as part of the manage, turn on a DI attribute to direct the printing device to add the DI to the printed output on at least one of the sides of the printable medium.

14. The device of claim 12, wherein the one or more processors, as part of the manage, add the DI to the printable data such that the DI is printed on at least one of the sides of the printable medium.

15. The device of claim 10, wherein the one or more COI include one or more of types of documents, document characteristics, applications, printing device locations, computing devices, operating systems, resource state of the printing device, printing device-based modifications to user-selected printing settings, printing network policy-based modifications to user-selected printing settings, and operating systems associated with the request to print content.

16. The device of claim 10, wherein the one or more processors, as part of the manage, position the DI relative to the printable data with respect to at least one side of the printable medium.

17. The device of claim 10, wherein the DI includes one or more of a printed message, icon, graphic, mark, token, and watermark applied to at least a first side of a printable medium that indicates the presence of a portion of the printed data on a second side of the printable medium.

18. A computer program product comprising a non-signal computer readable storage medium comprising computer executable code to:
    analyze a request to print content to determine one or more characteristic of interest (COI) associated with the request, the request to print content including printable data representative of one or more of a document and an image;
    identify types of printing attributes associated with the request, the types of printing attributes including printing settings and a duplex setting to be implemented at the printing device in connection with generating printed output, wherein the duplex setting is a field having an "ON" status and an "OFF" status;

wherein the duplex setting has the "ON" status;

determine a user duplex expectation (UDE) status with respect to the duplex setting and the one or more COI;

manage addition of duplex indicia (DI) to the printed output based on the determining; and process the request;

wherein processing the request includes providing only simplex indicia to the printed output when the duplex setting has the "ON" status based on the UDE status.

19. The computer program product of claim 17, wherein the duplex setting directs the printing device to generate the printed output on both sides of a printable medium based on the "ON" status.

20. The computer program product of claim 17, wherein when the duplex setting has the "OFF" status, the UDE status is determined to add the DI to the printed output.

* * * * *